United States Patent Office 2,834,819
Patented May 13, 1958

2,834,819

PRODUCTION OF LOW MOLECULAR WEIGHT POLYMER WITH SULFONIC ACID-CONTAINING POLYMER AS CATALYST

Gaetano F. D'Alelio, Pittsburgh, Pa., assignor to Koppers Company, Inc., a corporation of Delaware No Drawing. Application April 11, 1952
Serial No. 281,884

29 Claims. (Cl. 260—669)

This invention relates to a process for the polymerization of polymerizable ethylenic monomers. More particularly it relates to the polymerization of polymerizable ethylenic monomers by the use of fusible aqueous-alkali-soluble low molecular weight polymers having sulfonic acid groups therein.

In my copending application, Serial Number 117,721, filed September 24, 1949, now U. S. Patent 2,593,417, there is disclosed the utility as polymerization catalysts of cross-linked cation-exchange resins having sulfonic acid groups therein. These are known to be insoluble, infusible resins. It has now been discovered that fusible aqueous-alkali-soluble low molecular weight polymers having sulfonic acid groups therein possess certain advantages over the insoluble resins disclosed in the above-mentioned application.

The aqueous-alkali-soluble polymers embraced by this invention have been found to have particular utility in the production of low molecular weight polymers derived from ethylenic monomers. For example, polymeric compositions comprising predominantly dimers, trimers, and tetramers can be obtained using aqueous-alkali-soluble low molecular weight polymers having sulfonic acid groups therein as catalyst for the polymerization. Further, it is possible to remove these catalysts from a polymerization mixture by filtration since their salts with divalent metals, such as calcium, barium, etc., are insoluble and precipitate upon formation.

Catalysts useful in the process of this invention are illustrated by phenol sulfonic acid-formaldehyde condensation products of a mole ratio of 3/2 and sulfonated polystyrenes having molecular weights approximately in the range 1000–60,000.

These cation-exchange compositions can be used as easily separable and easily recoverable catalysts for the polymerization of polymerizable ethylenic monomers.

The process of this invention may be carried out in its simplest form by merely dispersing small amounts of sulfonated polymer in a polymerizable ethylenic monomer at an appropriate temperature for a suitable period of time, thereafter removing the catalyst, e. g., by precipitation, by filtration, decantation, etc., and separating the polymer or oligomer from any unreacted monomer, solvent, etc., by any convenient method, e. g., fractionating the products or stripping the unpolymerized monomer low boiling product or solvent.

The practice of the invention is best described by the following examples. Examples I and II illustrate the preparation of two compositions suitable for use in the practice of the invention. Examples III and IV illustrate the use of the catalysts prepared in Examples I and II. These examples serve to illustrate various methods of practicing the invention and are not intended as limitations to the scope of the invention. In these examples and throughout the specification "parts" and "percent" are given in parts and percent by weight.

EXAMPLE I

Low molecular weight polystyrene (of approximate molecular weight of 6000), 156 grams, was dissolved in 2970 grams carbon tetrachloride in a 3-neck 5-liter flask equipped with agitator, thermometer, and reflux condenser. The solution was cooled in an iced bath to 0.5° C. and 73.2 ml. (130.2 grams) chlorosulfonic acid was added dropwise with agitation and the temperature was maintained at 0.5° C. for 3 hours. The contents of the flask was then allowed to warm to room temperature.

The carbon tetrachloride and hydrochloric acid were removed in vacuum in a stream of air at 40° C. and the residue (approximately 200 grams) ground to a fine powder. The product was dissolved in 300 ml. of water and 9.4 grams of approximately 95% sodium hydroxide in 25 ml. water was added. The solution was filtered and several small chunks of insoluble polymer removed. The filtrate was acidified and the water was removed by heating under a vacuum. The polymer had approximately 0.7 sulfonic acid groups per aromatic nucleus.

EXAMPLE II 13.7 grams of 36.5% formaldehyde was added slowly to 66.7 grams of 65.4% phenol sulfonic acid which had been cooled to 20° C. in an Erlenmeyer flask. Intermittent cooling in tap water was necessary to keep the reaction temperature at 24–27° C. in the first 4 hours. After standing for 24 hours at room temperature, 25 ml. of 50% sodium hydroxide was added to bring the pH of the turbid brown solution to 9.4. The precipitate which settled out was removed by filtration. The filtrate was acidified with 10 ml. of 96% sulfuric acid and allowed to stand 10 hours. It was then filtered to remove sodium sulfate and 3.1 grams barium carbonate was added to the filtrate which was shaken intermittently for 1 hour and filtered. The solution was then distilled under water-faucet vacuum in a stream of nitrogen out of a resin flask at 59–60° C. for 20 hours. The product, a red solid cake, was ground to a fine powder.

EXAMPLE III

Styrene was polymerized using the catalysts of Examples I and II as follows. The required amount of catalyst was weighed in a 12-ounce glass container and 11 ml. (10 grams) of styrene containing about 6 parts per million of tertiary-butyl catechol was added. The atmosphere was purged with a stream of nitrogen and sealed immediately with an aluminum-lined cap. The glass container was agitated and maintained at approximately 90° C. for 12 hours. The results of these polymerizations are shown in Table 1 wherein it will be observed from the Gardner viscosities reported that there were obtained products which were predominantly dimers and trimers of styrene. Before determining the non-volatile content, the products were either decanted or filtered to separate them from the catalyst.

Table I

[Charge: 100 grams styrene.]

| Expt. No. | Catalyst | Grams | Product | |
|---|---|---|---|---|
| | | | Color | Gardner-Holdt Bubble Viscosity |
| 1 | Example I | 0.5 | Very light straw | D |
| 2 | ----do---- | 1 | Light straw | J |
| 3 | ----do---- | 5 | Light yellow | X-Y |
| 4 | ----do---- | 10 | Yellow | B |
| 5 | Example II | 0.5 | Tan | $Z_5$-$Z_6$ |
| 6 | ----do---- | 1 | Light brown | $Z_6^+$ |
| 7 | ----do---- | 5 | Brown | $Z_7$ |
| 8 | ----do---- | 10 | ----do---- | Y |

When these products were exposed 20 hours at 45° C.

and 25" mercury vacuum with 10 grams hydroquinone/100 grams product as polymerization inhibitor, all showed non-volatile percentages in excess of 93% except Experiment No. 1 which showed 75% non-volatile.

EXAMPLE IV

Isobutylene was polymerized using the catalysts of Examples I and II as follows: Approximately 12 grams of freshly distilled purified isobutylene was added to a tarred 12-ounce glass container containing the indicated amount of catalyst. The excess isobutylene was allowed to boil off and displace the air inside the bottle. When exactly 10 grams of isobutylene remained in the container it was capped and then agitated and maintained at approximately 90° C. for 12 hours. The results of these polymerizations are shown in Table II. The boiling range of the products indicates (1) that the product is isobutylene-free, (2) that the product is comprised predominantly of diisobutylene (B. P. 103° C. at 760 mm.) and triisobutylene (B. P. 179° C. at 760 mm.). These data indicate that the product contains 60–80% diisobutylene.

*Table II*

[Charge: 10.0 grams isobutylene]

| Experiment No | 1 | 2 |
|---|---|---|
| Catalyst | Example I | Example II. |
| Amount | 1.0 gram | 1.0 gram. |
| Percent Yield [1] | 63 | 97. |
| Product Color | Colorless | Yellow. |
| Boiling Range (Rate of Heating=1–2°/min.), T., °C.: | | |
| 110–115 vol. percent | 20 | 10. |
| 115–120 do | 10 | 0. |
| 120–125 do | 20 | 0. |
| 125–130 do | 20 | 0. |
| 130–135 do | 10 | 20. |
| 135–140 do | 0 | 20. |
| 140–145 do | 0 | 10. |
| 145–155 do | 0 | 0. |
| 155–160 do | 0 | 0. |
| 160–170 do | 0 | 0. |
| 170–180 do | 5 | 0. |
| 180–190 do | 10 | 10. |
| 190–195 do | 0 | 20. |
| Residue do | 5 | 10. |

[1] Unreacted isobutylene evaporated for 24 hours at room temperature.

EXAMPLE V

Example III is repeated substituting for the styrene there used a similar quantity of alpha-methylstyrene. There is obtained a product comprised predominantly of dimers and trimers.

It will be realized that the polymerizations illustrated by Examples III, IV and V can be carried out under various conditions. That is, variation of the temperature of reaction and catalyst concentration will give rise to a variety of polymeric products. Also, the reaction can, if desired, be run in the presence of a suitable solvent. In general, desirable results are obtained when the polymerization is carried out at a temperature in the range of 50–150° C. Excellent results are obtained when the reaction is carried out at approximately 90° C.

The process of this invention may be applied to all types of polymerizable ethylenic monomers including maleates, fumarates, itaconates, acrylates, methacrylates, acrylamides, vinyl esters, vinyl halides, acrylonitrile, vinyl ethers, N-vinyl imides, N-vinyl carbazole, and advantageously the hydrocarbon monomers which are normally easily polymerized by Friedel-Crafts and acid-type polymerization catalysts, e. g. propylene, butene-1, isobutylene, isoamylene, vinyl cyclohexene, cyclopentadiene, styrene, alpha-methylstyrene, nuclear alkylated styrenes, such as o-, m-, p-methylstyrenes and o-, m-, p-ethylstyrenes, etc., and corresponding derivatives of alpha-methylstyrene, vinyl naphthalenes, vinyl diphenyls, etc. In addition, various other alkenyl aryl compounds other than hydrocarbons are advantageously polymerized by the catalysts of this invention, for example those having non-hydrocarbon nuclear substituents, e. g., chlorostyrenes, vinyl chloronaphthalenes, methoxystyrenes, vinyl methoxynaphthalenes, etc. These monomers may be polymerized individually or in mixtures containing any number of these monomers.

Examples I and II illustrate the preparation of two particular catalytic materials useful in the practice of the invention. In general, cation-exchange materials containing sulfonic acid groups, which materials are aqueous-alkali soluble, are useful as are sulfonated low molecular weight polymers. Aqueous-alkali soluble, low molecular weight vinyl aryl polymers having sulfonic acid groups therein give desirable results.

While there are above disclosed but a limited number of embodiments of the invention, it is possible to produce still other embodiments without departing from the inventive concept herein disclosed, and it is therefore, desired that only such limitations be imposed upon the appended claims as are stated therein or required by the prior art.

I claim:

1. A process for the production of polymeric compositions comprising predominantly dimers, trimers and tetramers comprising the polymerization of a polymerizable mass comprising at least one polymerizable ethylenic monomer in the presence of a fusible, aqueous-alkali-soluble polymer having sulfonic acid groups therein as a catalyst.

2. A process of claim 1 in which the polymerizable ethylenic monomer is a vinyl aryl compound.

3. A process of claim 2 in which the catalyst is sulfonated low molecular weight polystyrene.

4. A process of claim 1 in which the polymerizable ethylenic monomer is a vinyl aromatic hydrocarbon.

5. A process of claim 4 in which the catalyst is sulfonated low molecular weight polystyrene.

6. A process of claim 1 in which the polymerizable ethylenic monomer is styrene.

7. A process of claim 6 in which the catalyst is sulfonated low molecular weight polystyrene.

8. A process of claim 1 in which the polymerizable ethylenic monomer is an alkenyl aryl compound.

9. A process of claim 1 in which the polymerizable ethylenic monomer is an alkenyl aryl hydrocarbon.

10. A process of claim 1 in which the polymerizable ethylenic monomer is alpha-methylstyrene.

11. A process of claim 10 in which the catalyst is sulfonated low molecular weight polystyrene.

12. A process of claim 1 in which the polymerizable ethylenic monomer is an unsaturated non-aromatic hydrocarbon having at least three carbon atoms.

13. A process of claim 12 in which the catalyst is sulfonated low molecular weight polystyrene.

14. A process of claim 1 in which the polymerizable ethylenic monomer is isobutylene.

15. A process of claim 14 in which the catalyst is sulfonated low molecular weight polystyrene.

16. A process for the production of polymeric compositions comprising predominantly dimers, trimers and tetramers comprising the polymerization of a polymerizable mass comprising at least one polymerizable ethylenic monomer in the presence of a fusible, aqueous-alkali-soluble polymer having sulfonic acid groups therein as a catalyst and at a temperature in the range 50–150° C.

17. A process of claim 16 in which the polymerization is carried out at approximately 90° C.

18. A process of claim 16 in which the polymerizable ethylenic monomer is a vinyl aromatic compound.

19. A process of claim 18 in which the catalyst is sulfonated low molecular weight polystyrene.

20. A process of claim 18 in which the vinyl aromatic compound is styrene.

21. A process of claim 20 in which the catalyst is sulfonated low molecular weight polystyrene.

22. A process of claim 21 in which the polymerization is carried out at approximately 90° C.

23. A process of claim 16 in which the polymerizable ethylenic monomer is an alkenyl aryl compound.

24. A process of claim 23 in which the alkenyl aryl compound is alpha-methylstyrene.

25. A process of claim 24 in which the catalyst is sulfonated low molecular weight polystyrene.

26. A process of claim 25 in which the polymerization is carried out at approximately 90° C.

27. A process of claim 16 in which the polymerizable ethylenic monomer is isobutylene.

28. A process of claim 27 in which the catalyst is sulfonated low molecular weight polystyrene.

29. A process of claim 28 in which the polymerization is carried out at approximately 90° C.

References Cited in the file of this patent

UNITED STATES PATENTS

| | | |
|---|---|---|
| 2,533,210 | Baer | Dec. 12, 1950 |
| 2,590,834 | Faulkner | Apr. 1, 1952 |